US009175841B2

(12) United States Patent
Hoetzl et al.

(10) Patent No.: US 9,175,841 B2
(45) Date of Patent: Nov. 3, 2015

(54) LIGHTING DEVICE AND METHOD FOR PRODUCING A HEAT SINK OF THE LIGHTING DEVICE AND THE LIGHTING DEVICE

(75) Inventors: Guenter Hoetzl, Regensburg (DE); Fabian Reingruber, München (DE)

(73) Assignee: OSRAM GmbH, Munich (DE)

( * ) Notice: Subject to any disclaimer, the term of this patent is extended or adjusted under 35 U.S.C. 154(b) by 68 days.

(21) Appl. No.: 13/496,138

(22) PCT Filed: Aug. 25, 2010

(86) PCT No.: PCT/EP2010/062383
§ 371 (c)(1), (2), (4) Date: Mar. 14, 2012

(87) PCT Pub. No.: WO2011/029724
PCT Pub. Date: Mar. 17, 2011

(65) Prior Publication Data

US 2012/0170262 A1 Jul. 5, 2012

(30) Foreign Application Priority Data

Sep. 14, 2009 (DE) ......................... 10 2009 041 477
Nov. 12, 2009 (DE) ......................... 10 2009 052 930

(51) Int. Cl.

| | |
|---|---|
| ***B60Q 1/06*** | (2006.01) |
| ***F21V 29/00*** | (2015.01) |
| ***F21V 3/02*** | (2006.01) |
| ***F21V 29/507*** | (2015.01) |
| ***F21V 29/71*** | (2015.01) |
| ***F21V 29/77*** | (2015.01) |
| ***F21V 29/83*** | (2015.01) |
| ***F21V 29/89*** | (2015.01) |

(Continued)

(52) U.S. Cl.
CPC ................. *F21V 29/004* (2013.01); *F21V 3/02* (2013.01); *F21V 29/20* (2013.01); *F21V 29/507* (2015.01); *F21V 29/713* (2015.01); *F21V 29/77* (2015.01); *F21V 29/83* (2015.01); *F21V 29/89* (2015.01); *F21K 9/135* (2013.01); *F21Y 2101/02* (2013.01); *Y10T 29/49002* (2015.01)

(58) Field of Classification Search
CPC ..... F21V 29/004; F21V 15/011; F21V 29/20; F21V 29/22; F21V 29/2212; F21V 29/2218; F21V 29/2225; F21V 29/2231; F21V 29/2237
USPC .............................. 362/373, 294; 313/45, 46
See application file for complete search history.

(56) References Cited

U.S. PATENT DOCUMENTS

| | | | | |
|---|---|---|---|---|
| 5,537,301 A * | 7/1996 | Martich | ........................ | 362/218 |
| 6,782,941 B2 * | 8/2004 | Lee | ............................. | 165/80.3 |
| 7,288,796 B2 * | 10/2007 | Dry | ................................ | 257/88 |

(Continued)

FOREIGN PATENT DOCUMENTS

| | | |
|---|---|---|
| CN | 101338887 | 1/2009 |
| CN | 101514808 | 8/2009 |

(Continued)

*Primary Examiner* — Jong-Suk (James) Lee
*Assistant Examiner* — Erin Kryukova
(74) *Attorney, Agent, or Firm* — Cozen O'Connor

(57) ABSTRACT

A lighting device (1; 21; 41) having at least one heat sink (5; 44) for cooling at least one light source, wherein the at least one heat sink (5; 44) comprises one or more at least bent sheet metal parts.

11 Claims, 8 Drawing Sheets

(51) Int. Cl.
*F21Y 101/02* (2006.01)
*F21K 99/00* (2010.01)

(56) References Cited

U.S. PATENT DOCUMENTS

| | | | | |
|---|---|---|---|---|
| 7,524,089 | B2 * | 4/2009 | Park | 362/294 |
| 2007/0097692 | A1 | 5/2007 | Suehiro et al. | |
| 2007/0285926 | A1 * | 12/2007 | Maxik | 362/294 |
| 2008/0037255 | A1 * | 2/2008 | Wang | 362/294 |
| 2008/0157112 | A1 * | 7/2008 | He et al. | 257/98 |
| 2008/0175003 | A1 | 7/2008 | Tsou et al. | |
| 2008/0186704 | A1 | 8/2008 | Chou et al. | |
| 2008/0310167 | A1 * | 12/2008 | Zaderej et al. | 362/294 |
| 2009/0189169 | A1 * | 7/2009 | Wei | 257/98 |
| 2010/0103666 | A1 * | 4/2010 | Chang et al. | 362/234 |
| 2010/0109499 | A1 * | 5/2010 | Vilgiate et al. | 313/1 |
| 2010/0133578 | A1 * | 6/2010 | Pickard et al. | 257/99 |
| 2011/0001417 | A1 * | 1/2011 | Stekelenburg | 313/46 |

FOREIGN PATENT DOCUMENTS

| | | |
|---|---|---|
| DE | 20 2006 009 553 | 10/2006 |
| DE | 10 2006 061 020 | 5/2008 |
| DE | 20 2009 001 079 | 4/2009 |
| EP | 2 023 409 | 2/2009 |

* cited by examiner

LIGHTING DEVICE AND METHOD FOR PRODUCING A HEAT SINK OF THE LIGHTING DEVICE AND THE LIGHTING DEVICE

RELATED APPLICATIONS

This is a U.S. national stage of application No. PCT/EP2010/062383, filed Aug. 25, 2010.

This application claims the priority of German application no. 10 2009 041 477.0 filed Sep. 14, 2009 and 10 2009 052 930.6 filed Nov. 12, 2009, the entire content of both of which are hereby incorporated by reference.

FIELD OF THE INVENTION

The invention relates to a lighting device having at least one heat sink for cooling at least one light source, a method for producing a heat sink of the lighting device and a method for producing the lighting device.

BACKGROUND OF THE INVENTION

In LED lamps, an LED board is frequently fitted with LEDs, it being possible for the LEDs to be driven via suitable driver electronics. Any power dissipation on the LED board or the driver electronics is released into the ambient air via a heat sink. The heat sinks mainly used for this are either made of pressure cast aluminum or are so-called staged fin heat sinks in which multiple individual metal sheets are joined together to form a complete heat sink by means of joining technologies such as pressing, gluing or soldering. The heat sink normally encloses the driver housing, which in turn seals off the driver electronics from the surrounding area. The LED board with the LEDs on it is fastened to the heat sink mechanically by means of screw or bonded joints.

SUMMARY OF THE INVENTION

One object of the invention is to provide a particularly simply and inexpensively producible lightweight option for cooling a lighting device.

This and other objects are attained in accordance with one aspect of the present invention directed to a lighting device with at least one heat sink for cooling at least one light source, wherein the at least one heat sink comprises one or more at least bent sheet metal parts. In other words, the device comprises at least one sheet metal part that has at least been formed by means of at least one bending process. A particularly lightweight heat sink is obtained through the use of the at least one sheet metal part. Furthermore, the use of the at least one sheet metal part makes it possible to use a particularly simple and inexpensive production process, namely the bending process, to produce the heat sink. A preformed (e.g. previously blanked) semi-finished metal sheet can be used, so that only the bending process still needs to be executed.

In one embodiment, the heat sink comprises at least one punched and bent sheet metal part. In other words, the device comprises at least one sheet metal part that has been formed by means of at least one separation method, in particular a punching method, and by means of at least one bending process. The punched/bent sheet metal part can be produced from a simple metal sheet that is not processed, or is only slightly processed, which simplifies production. The punching process and the bending process can be integrated into a single process.

The at least one light source can comprise any desired light source. In particular, the at least one light source can comprise at least one semiconductor light source, for example, at least one laser diode or at least one light-emitting diode (LED). The at least one LED can be in the form of one or more individual LEDs (individually mounted LEDs) or of one or more groups of LEDs or LED chips (LED clusters) on a common substrate (e.g. a submount). Each of the LEDs or LED chips can emit monochrome or polychrome light, e.g. white light. An LED cluster can thus comprise multiple individual LEDs or LED chips which together can result in a blended white light, e.g. "cold white" or "warm white". The individual chips and/or the LED clusters can be equipped with suitable optics for the purpose of beam guidance, e.g. Fresnel lenses, collimators, etc. Instead of or in addition to inorganic light-emitting diodes based, for example, on InGaN or AlInGaP, organic LEDs (OLEDs) can generally also be used. The carrier substrate can then be configured as an LED board.

In another embodiment, the at least one heat sink is constructed of one or more bent sheet metal parts. In other words, the heat sink consists primarily or wholly of one or more at least bent sheet metal parts and not, for example, of cast parts. As a result, the heat sink can essentially be completely lightweight and can be produced using simple means. The sheet metal part or parts can also be punched/bent sheet metal parts.

The sheet metal is preferably made of a material with good heat-conducting properties (heat conductivity of at least 15 W/(m·k), for example steel). To improve heat removal, a material with higher heat conductivity, for example containing or made of aluminum or copper, can be used. The choice of material can also influence the thickness of sheet metal required for the spreading of heat within the heat sink.

In another embodiment, the one or more at least bent (for example punched and bent) sheet metal parts comprise alternating bent segments ("heat sink segments") and clearances. The bent heat sink segments can serve as "cooling ribs", for example, freestanding cooling ribs, whilst the clearances allow a sufficient flow of air to all sides of the bent heat sink segments. Fresh air can thus flow around both the inner and outer sides of the heat sink segments. The resulting surface of the heat sink segments can be of a similar size to that of a conventional heat sink with a rib structure, or even larger.

In a particular embodiment, the at least one heat sink has an essentially tube-like or sleeve-like basic shape and comprises bent segments and clearances alternating in a peripheral direction. As a result of the clearances, fresh air can be directed to the space surrounded by the heat sink.

In another embodiment for the purpose of increasing heat removal capacity, each of at least some of the bent heat sink segments comprises at least one bent cooling fin. The cooling fins can be produced by punching of a kind such that, in addition, less waste material is produced during punching.

In a further embodiment, the at least one heat sink has a surface that leads to increased heat removal. In other words, it can be preferential to increased heat emission that at least some areas of the surface of the at least one heat sink are surface-treated. The surface can thus be painted or anodized in order to achieve a desired coloration of the heat sink. To increase heat removal, the at least one heat sink can also undergo a surface treatment in which the surface is roughened in order to increase its area.

In another embodiment, a driver housing is inserted into the heat sink.

In still another embodiment, each of the bent heat sink segments comprises a free end that is fastened to the driver housing. As a result, the heat sink segments are prevented from bending upwards. The fastening can be accomplished by, for example, a meshing element located on the bent heat sink segment in question, in particular at its free end, engaging with a counter meshing element (e.g. appropriately shaped notches) on the driver housing. The heat sink segments can be secured against bending upwards, particularly at an upper driver housing (part), for example in notches.

In a further embodiment, the driver housing comprises at least one cooling rib, it being possible for at least part of each cooling rib to protrude into (including through) the clearance. As a result, heat removal from the driver housing can be improved without significant obstruction of the air supply to the heat sink segments, as a result, in turn, of which, overheating of the driver located in the driver housing can be avoided more effectively. Preferably, the driver housing can comprise multiple cooling ribs arranged equidistantly in a peripheral direction. Particularly if size is not limited by standard, for example in the case of a retrofit lamp, the cooling rib can also protrude beyond the clearance.

The at least one cooling rib can, for example, be produced separately and only be fixed, for example glued, to the driver housing, for example inserted in a groove, particularly a longitudinal groove, in a subsequent step. The cooling rib can be made of plastic or metal.

Alternatively, the at least one cooling rib can be made of plastic and, for example, be sprayed onto the driver housing, or can be produced so as to be integral with it, for example by means of an injection molding method. The plastic is preferably a heat-conducting plastic with heat conductivity of between approx. 1 W/(m·k) and approximately 10 W/(m·k).

The driver housing can generally be made of metal and/or plastic.

The driver housing can, for example, be configured so as to have two parts, an upper and a lower driver housing. The upper driver housing and the lower drive housing can be connectable. The upper driver housing and the lower driver housing can also be fixed together mechanically, for example by means of a snap connection.

For even better cooling of the driver electronics, these can advantageously be thermally coupled to the driver housing in order that their waste heat be transported to the driver housing more effectively. This can, for example, be accomplished by simply casting the driver electronics, for example using a casting material with relatively good heat conductivity, such as an epoxy resin, polyurethane and/or a silicone-based material.

In another embodiment, the heat sink comprises a contact area on which a carrier substrate for the at least one light source can be placed, it being possible for the bent heat sink segments to extend from the contact area.

In another embodiment, the contact area of the heat sink is located at a distance from the driver housing for the purpose of thermally insulating the driver housing from the warm carrier substrate, with, for example, a defined air gap being provided for this purpose between the driver housing and the heat sink. This can be implemented by means, for example, of a ledge, preferably made of plastic, on the driver housing, in particular on a cable feed-through from the driver electronics to the carrier substrate.

An embodiment also exists in which the lighting device comprises an at least partly translucent bulb with at least one catch device (e.g. a snap-fit hook or snap-in nose), which is mounted in such a way that it locks onto the heat sink. In particular, the catch device can engage with a corresponding clearance in the heat sink and, for example, together with a contact area of the heat sink, lock onto the carrier substrate.

The bulb is preferably configured as a plastic bulb and, for example, to be milky-white, in order to act as a diffuser, but can also be transparent.

In another embodiment, the bulb presses the edge of the carrier substrate onto the heat sink, either around its entire periphery or at points or in regions around the periphery. This—together, if desired, with a thermal interface material (TIM) in between—assures a good thermal connection.

The heat sink can generally be configured either to form a single piece or to form multiple pieces. In still another embodiment, the heat sink is constructed in two parts, namely two bent sheet metal parts, in particular punched sheet metal parts, it being possible, in particular, for the two bent sheet metal parts to be held together at least by means of the driver housing and the bulb. An (at least) two-part construction simplifies production and assembly.

Another aspect of the invention is directed to a method for producing a heat sink of the lighting device wherein the method comprises at least the following steps:

- Blanking radially extending clearances at an edge of a metal sheet;
- Bending upwards the heat sink segments that remain between the clearances at a central contact area.

After blanking, the semi-finished metal sheet thus produced can comprise a central area of which at least part, following the bending process, will form a contact area for the carrier substrate. The central area can, for example, be circular with, for example, heat sink segments extending radially from it that are equidistant in a peripheral direction and have, for example, an essentially rod, strip or bar-like basic shape. After being bent upwards (preferably at their edge adjoining the central area), these heat sink segments become the bent heat sink segments serving as cooling elements.

In a further embodiment, the method also comprises the following step: bending of cooling fins on the (remaining) heat sink segments. This further improves the emission of heat into the surrounding area by the heat sink segments.

Another aspect of the invention is directed to a method for producing a lighting device wherein the method comprises at least the following steps:

- Inserting a driver housing into the heat sink; and/or
- Fixing a carrier substrate to the contact area.

BRIEF DESCRIPTION OF THE DRAWINGS

In the drawings, the same or equivalent elements have the same reference numbers.

DETAILED DESCRIPTION OF THE DRAWINGS

Figure 1:
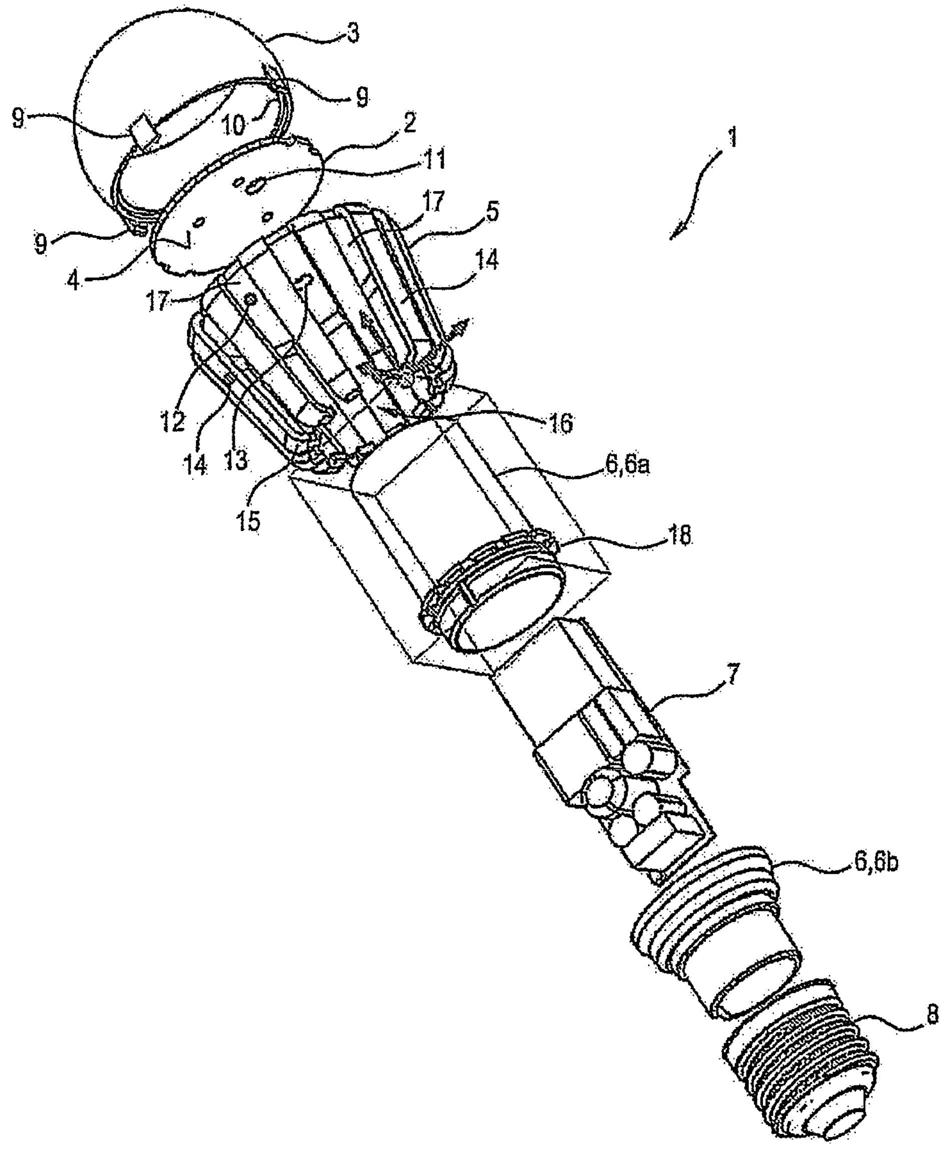
FIG. 1 is an exploded diagram showing a lighting device according to a first exemplary embodiment.

FIG. 1 is an exploded diagram of a lighting device 1. The lighting device 1 comprises the following individual elements: a carrier substrate 2 in the form of an LED board of which the front side is covered by a bulb 3 and the rear-facing contact area 4 lies flat on a heat sink 5. The lighting device 1 also has a two-part driver housing 6 that comprises an upper driver housing 6*a* and a lower driver housing 6*b*. Driver electronics 7 for driving multiple light sources (not visible) arranged on the front side of the carrier substrate 2 are installed in the driver housing 6. A base 8 (in this case, in the form of an Edison screw base) can be fitted to the lower driver housing 6*b* in order to supply the lighting device 1 with current. The lighting device can, for example, serve as a retrofit LED lamp to replace a traditional filament lamp.

The shape of the bulb 3 is that of a spherical cap, the body of which is slightly more than hemispherical. The bulb 3 is at least partly translucent in order that it can emit the light that radiates from the LEDs in an outward direction. In particular, the bulb 3 is made from a milky-white plastic material. The bulb 3 has four snap-fit hooks 9, or snap-in noses, so that the bulb 3 can be fastened by means of a simple locking process. In the embodiment shown, the snap-fit hooks 9 lock onto the heat sink 5. At the same time, the edge of the bulb 3 has a circular groove 10 into which the carrier substrate 2 can be fitted. As a result, the carrier substrate 2 can be fixed by means of the bulb 3, and can also be pressed onto the heat sink 5.

The basic shape of the carrier substrate 2 is that of a circular plate that fits into the groove 10 in the bulb 3. On its front side (not visible), which is covered by the bulb 3, are one or more light-emitting diodes serving as the at least one light source. Current is supplied to the light-emitting diodes via a cable feed-through opening 11, located off-centre in the carrier substrate 2, through which one or more electrical cables are fed from the driver electronics 7. For heat removal purposes, the rear-facing surface of the contact area 4 of the carrier substrate 2 sits on a corresponding contact area 12 of the heat sink 5. The carrier substrate 2 can lie directly on the heat sink 5, in particular being pressed onto it by the bulb 3; alternatively or in addition, the carrier substrate 2 can be joined to the heat sink 5 by means of an adhesive means, in particular a heat-conducting adhesive means (e.g. a heat-conducting paste or an adhesive film made of a thermal interface material (TIM)).

The heat sink 5 also has a cable feed-through opening 13 in its contact area 12 that covers the cable feed-through opening 11 and enables an electrical power supply and/or signal cables to be fed through from the drive electronics 7 to the light-emitting diodes. The contact area 12 is configured in the shape of a circular plate and has a slightly larger diameter than the carrier substrate 2. Multiple heat sink segments 14 extend from the edge of the contact area 12. These heat sink segments 14 are arranged equidistantly in a peripheral direction on the contact area 12 and, at their edge adjoining the contact area 12, are bent up to slightly past the vertical. The heat sink segments 14 have a strip, bar or rod-like basic shape. Each of the heat sink segments 14 is also bent inwards at its free end 15. In short, a heat sink 5 is produced of which the basic shape is essentially that of a tube or sleeve or, more precisely, a basic shape that slightly resembles a truncated cone, which is closed on one side by the contact area 12 and has a feed-in opening 16 on the opposite side, in the area of the free end 15. On the side, or the outside, the bent heat sink segments 14 alternate with corresponding clearances 17. The clearances 17 can also be seen as gaps between the heat sink segments 14 arranged equidistantly in a peripheral direction. In this embodiment, the heat sink 5 is produced as a single piece from a sheet metal workpiece, by means of a punching/bending method.

The heat sink 5 can, for example, be produced from an essentially circular plate-shaped metal sheet or a metal sheet blanked in the form of a circular plate, on the edge of which the radially extending clearances 17 are first of all blanked. This produces a punched metal sheet with the circular contact area 12 in the middle, from which the oblong heat sink segments 14, which are equidistant in a peripheral direction, extend. In a subsequent step, the heat sink segments 14 are bent up at their edge adjoining the contact area 12. Also, the free ends 15 are bent in the same direction. In addition, one or more areas of heat sink segments 14 can be bent further outwards in order to receive the cooling fins that project from the cooling sink segments 14. These work steps need not be executed in the order of sequence described above, but in a different order, and some can be executed simultaneously.

The sheet metal used to produce the heat sink 5 is preferably made of a material with good heat conductivity, for example steel. To improve the removal of heat from the light-emitting diodes, a material with better heat conductivity, such as copper or aluminum, can be used.

As part of the further assembly of the lighting device, the driver housing 6 can then be pushed through the feed-in opening 16 into the heat sink 5. To this end, the upper driver housing 6*a* and the lower driver housing 6*b* can be joined together, with the driver electronics being located in the driver housing 6. For better removal of heat to the driver housing 6 and/or for the purposes of mechanical protection, the driver electronics 7 can be secured within the driver housing 6, for example by means of a casting material. Alternatively or in addition, the driver electronics 7 can also be fixed to the driver housing 6 by means of a heat transfer paste, heat transfer pads, etc. For ease of assembly, the upper driver housing 6*a* and the lower driver housing 6*b* are fixed together mechanically, preferably by means of a snap connection.

Figure 2:
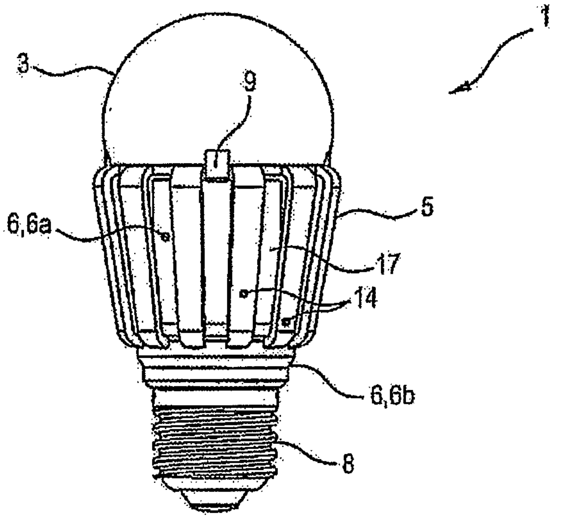
FIG. 2 is a side view of the lighting device according to the first exemplary embodiment.

FIG. 2 is a side view of the lighting device 1 in the assembled state. The lighting device 1 is particularly suitable for the replacement of a traditional filament lamp, i.e. for use as a retrofit LED lamp.

Figure 3:
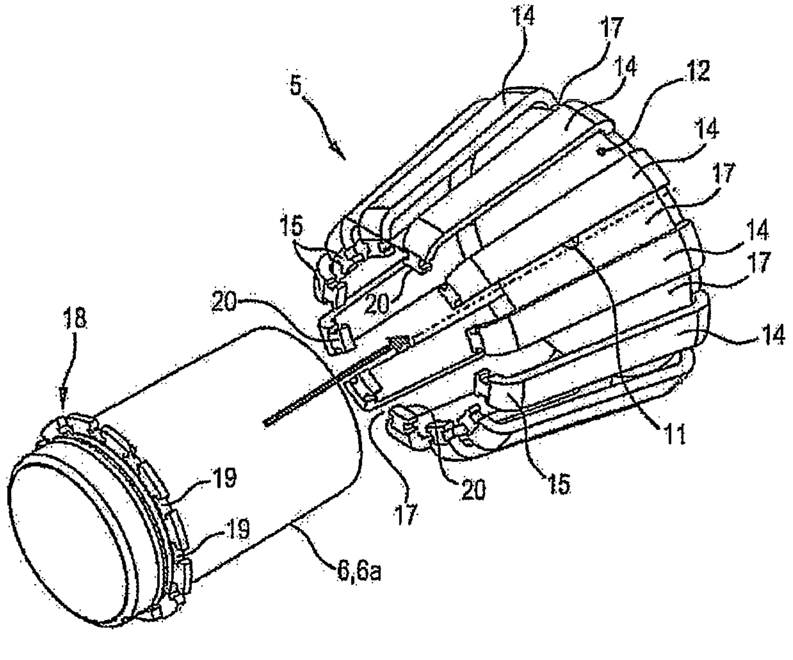
FIG. 3 shows a heat sink and an upper driver housing of the lighting device according to the first exemplary embodiment in a pre-assembly state.

FIG. 3 shows the heat sink 5 and the upper driver housing 6*a* in an as yet unassembled state. To assemble the heat sink, the upper drive housing 6*a* is pushed into the heat sink 5 in the direction indicated by the arrow.

At the level at which it is opposite the bent inwards free ends 15 of the heat sink 5, the upper driver housing 6*a* has a ring or edge 18 surrounding it that has clearances or notches 19 arranged equidistantly in a peripheral direction. These notches 19 are configured in such a way that complementarily shaped tips 20 of the free ends 15 of the corresponding heat sink segments 14 can be inserted into the corresponding notches 19. Thus, for each heat sink segment 14 there is a notch 19 into which it fits. The tips 20 are “T”-shaped, with the cross bar of the “T” being on the outermost end. When the driver housing 6 is inserted, the tips 20 engage with the notches 19 in such a way that the heat sink segments 14 can no longer be bent up, but are held firmly to the driver housing 6. It is also possible for each of the heat sink segments 14 to comprise appropriate meshing elements that fix the heat sink segments 14 to the driver housing 6 by engaging with corresponding counter meshing elements on the driver housing 6 when the heat sink 5 and the driver housing 6 are in the assembled state.

Figure 4:
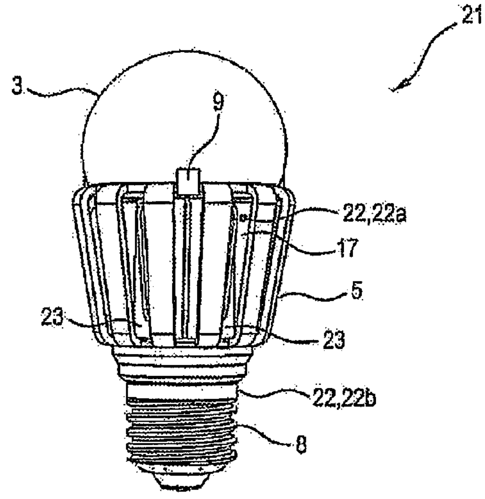
FIG. 4 is a side view of a lighting device according to a second exemplary embodiment.

FIG. 4 shows another lighting device 21 according to a second exemplary embodiment, in a diagram similar to that in FIG. 2.

Unlike the lighting device 1 according to the first exemplary embodiment, the lighting device 21 comprises a differently configured driver housing 22, namely with a lower driver housing 22*b* that is similar or the same and a upper driver housing 22*a* with cooling ribs 23 extending perpendicularly to and at a distance from, its peripheral or outer surface 22*c*. At least some of these cooling ribs 23 protrude into and/or through the clearances 17 of the heat sink 5. As a result, both improved heat removal from the driver housing 22 and, as a result, improved cooling of the driver electronics, can be achieved.

Figure 5:
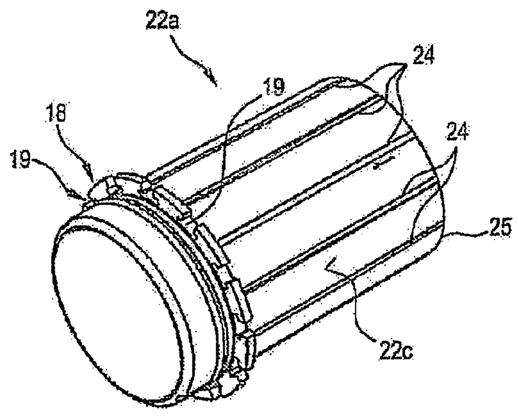
FIG. 5 shows an upper driver housing of the lighting device according to the second exemplary embodiment, without cooling ribs and viewed diagonally from behind.
Figure 6:
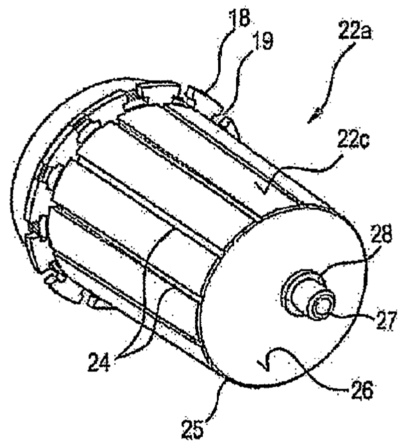
FIG. 6 shows the upper driver housing in FIG. 5, viewed diagonally from the front.

FIG. 5 shows the upper driver housing 22*a*, without the cooling ribs 23 and viewed diagonally from behind. FIG. 6 shows the upper driver housing 22*a*, also without the cooling ribs 23, and viewed diagonally from the front.

Longitudinal grooves 24 are located in the area in which the cooling ribs 23 are to adjoin the upper driver housing 22*a*, and extend in a longitudinal direction from an upper edge 25 of the upper driver housing 22*a* to the surrounding ring 18. These longitudinal grooves 24 serve to accommodate the cooling ribs 23, for example in that the cooling ribs 23 are inserted vertically, and glued, into the longitudinal grooves 24. A tube-shaped or sleeve-shaped cable feed-through 27, which can be fed through the cable feed-through openings 11 and 13 shown in FIG. 1, feeds through the top 26 of the upper driver housing 22*a*. At the point at which it passes through to the top 26 of the upper driver housing 6*a* the cable feed-through 27 has a radially broadened ledge 28.

Figure 7:
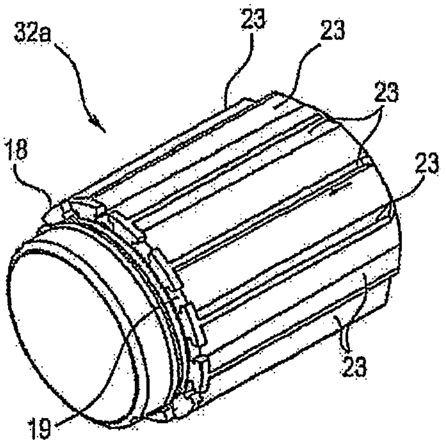
FIG. 7 shows an upper driver housing according to another embodiment, with cooling ribs.
Figure 8:
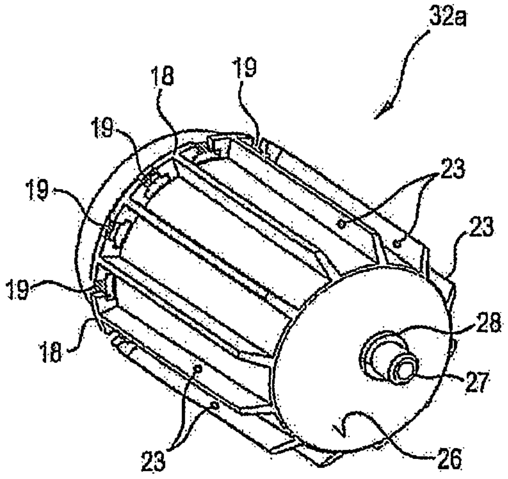
FIG. 8 shows the upper driver housing in claim 7, viewed diagonally from the front.

FIG. 7 shows an upper driver housing 32*a* according to another embodiment with the cooling ribs 23, viewed diagonally from behind, and FIG. 8 shows the same driver housing 32*a* viewed diagonally from the front. The cooling ribs 23 are not now separately produced and then connected to the upper driver housing but are produced so as to be integral with the driver housing 32*a*, for example by means of an injection molding method.

The lighting device will now be described in more detail by way of example and using the first exemplary embodiment. These embodiments are nevertheless universally valid, especially for the other embodiments shown. To this end, the lighting device 1 is first shown, in FIG. 9, in cross-sectional side view and in the assembled state. The interior of the driver housing 6, or 6*a*/6*b*, which is normally occupied by the driver electronics (not shown here, for simplicity's sake), is connected with the top of the carrier substrate 2 via the cable feed-through 27, so that cables can be fed from the driver electronics to the LEDs, or to a corresponding conductor structure.

Figure 9:
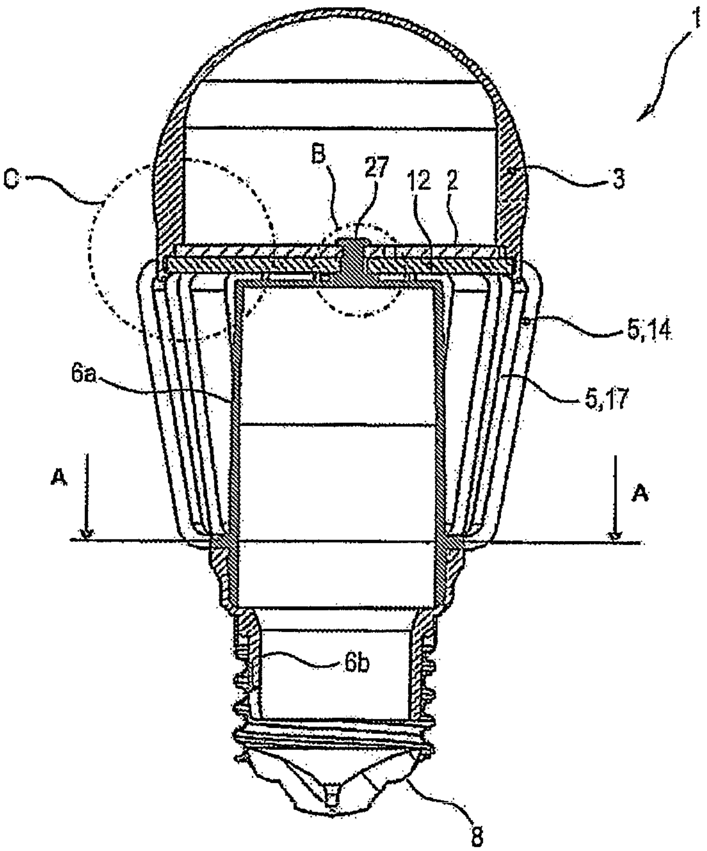
FIG. 9 is a cross-sectional side view of the lighting device according to the first exemplary embodiment.
Figure 10:
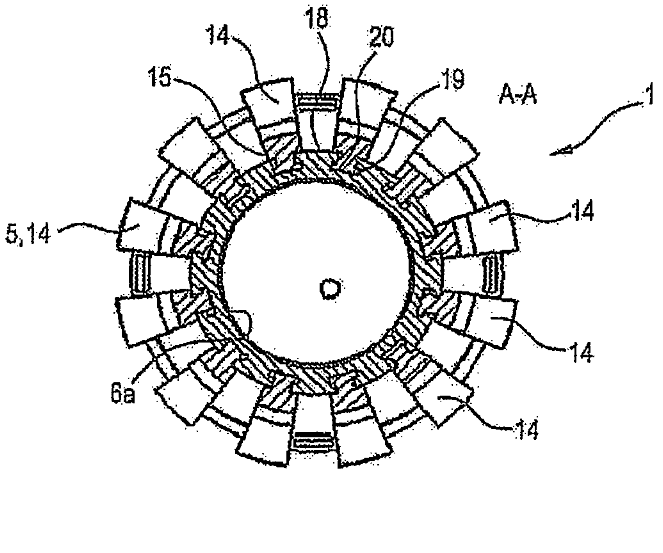
FIG. 10 is a plan view, on one sectional plane, of the lighting device in FIG. 9.

FIG. 10 is a plan view, on one sectional plane A-A, of the lighting device 1 in FIG. 9. The heat sink segments 14 are arranged equidistantly in a peripheral direction and the "T"-shaped tips 20 of their free ends 15 are fitted into the corresponding notches 19 on the ring 18. The "T"-shaped configuration of the tips 20 and notches 19 prevents heat sink segments 14 from bending upwards. However, the invention is not limited to the "T"-shaped configuration.

Figure 11:
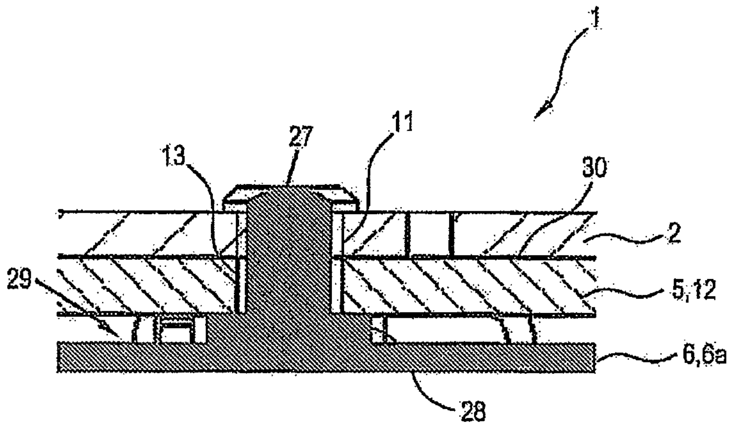
FIG. 11 shows a first detailed section of the lighting device shown in FIG. 9.

FIG. 11 shows the section B of the lighting device 1 shown in FIG. 9 in the area of the cable feed-through 27. The carrier substrate 2 for the light sources lies flat on the contact area 12 of the heat sink 5, above a thin adhesive film 30 made of a TIM. As a result of the ledge 28 of the cable feed-through 27 on which the heat sink 5 sits, an air gap 29 is produced between the heat sink 5 and the driver housing 6, or the upper driver housing 6*a*, which helps prevent the heat generated by the light-emitting diodes from being transferred to the upper driver housing 6*a*. As a result, overheating of the driver electronics is avoided.

Figure 12:
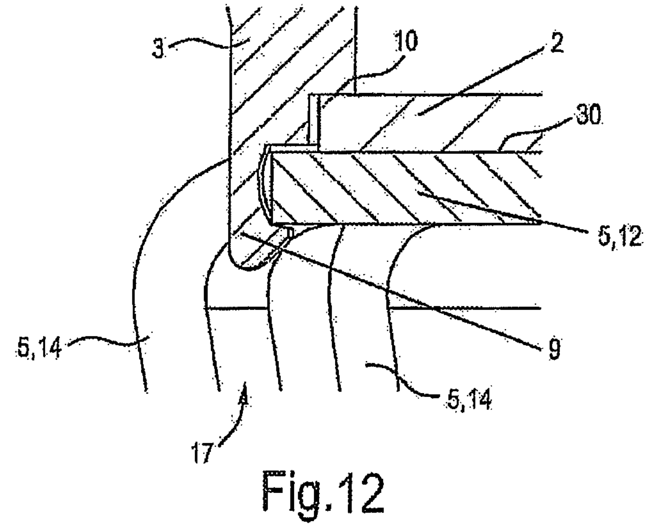
FIG. 12 shows a second detailed section of the lighting device shown in FIG. 9.

FIG. 12 shows an enlarged section C, as marked in FIG. 9, in the area of the snap-fit hook 9 of the bulb 3. The snap-fit hook 9 is fed through the clearance 17 and locks onto an underside of the contact area 12 of the heat sink, thus fastening the bulb 3 to the heat sink 5. At the same time, the carrier substrate 2 is pressed against the heat sink 5 by the inner groove 10 in the bulb 3. In order to improve both the transfer of heat from the carrier substrate 2 to the heat sink 5 and the fit of the carrier substrate 2.

Figure 13:
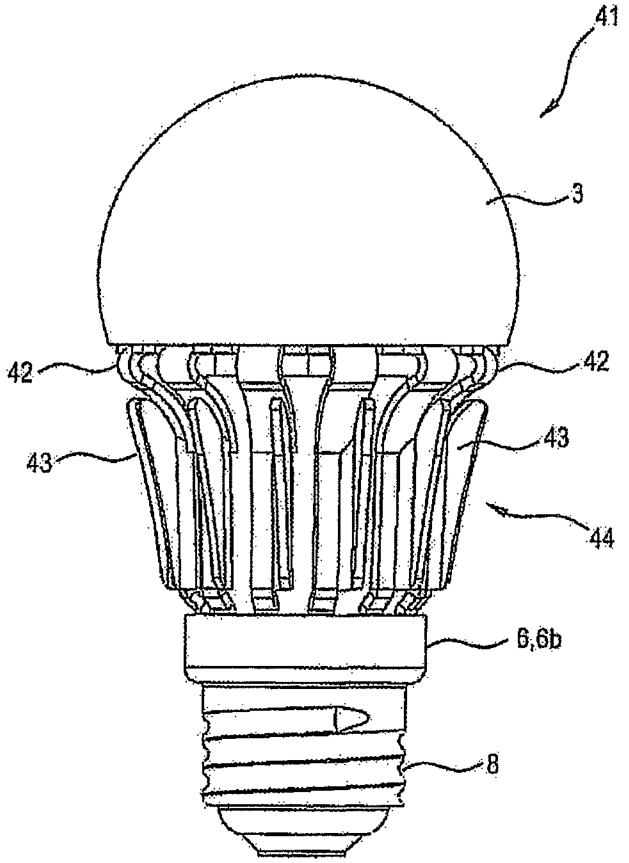
FIG. 13 is a side view of a lighting device according to a third exemplary embodiment.

FIG. 13 shows a lighting device 41 according to a third exemplary embodiment in a diagram similar to FIG. 2 and FIG. 4 wherein, unlike the first exemplary embodiment shown in FIG. 2, the heat sink segments 42 of the heat sink 44 now have bent cooling fins 43 on them that extend radially outwards. As a result, the area of conduction of the heat sink segments 42 is increased. The cooling fins 43 can, for example, be produced by means of appropriate shaping of the heat sink segments 14 and appropriate bending of the cooling fins 43.

Figure 14:
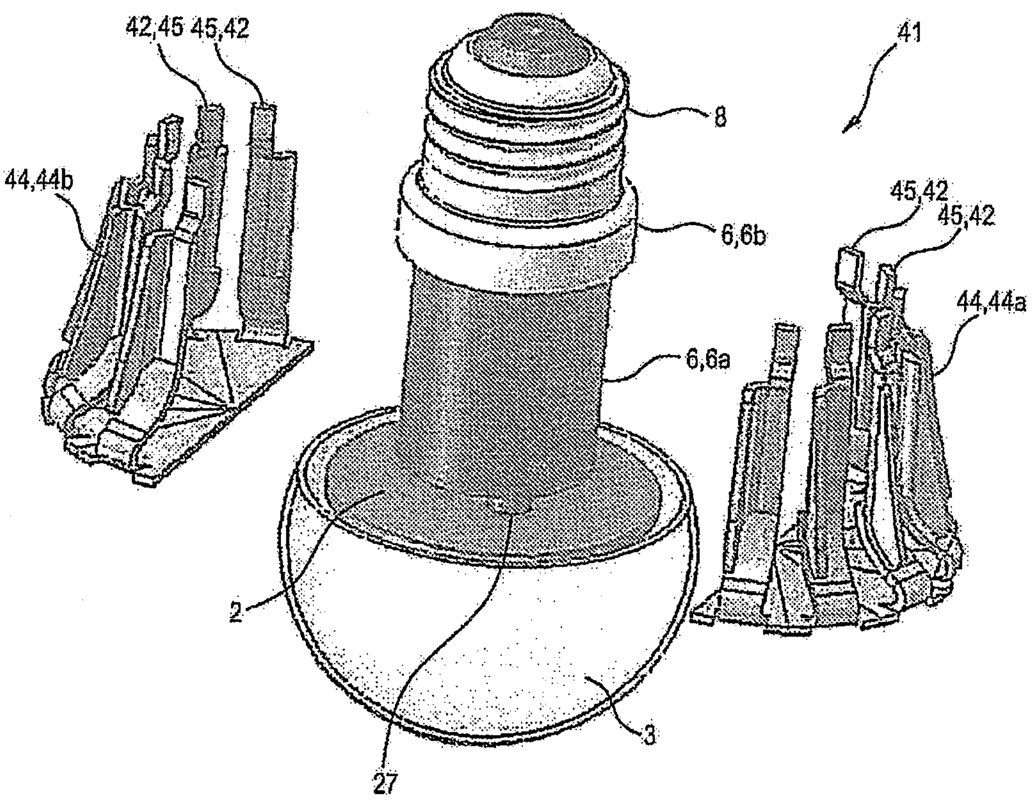
FIG. 14 is a partly exploded diagram of the lighting device according to the third exemplary embodiment, viewed diagonally.

FIG. 14 is a partly exploded diagram of the lighting device 41, viewed diagonally, in which the heat sink 44 is shown separated from the lighting device 41. The heat sink 44 is embodied as two parts, with the heat sink parts 44*a* and 44*b* being separated along a longitudinal plane of the lighting device 41. The free ends 45 of the corresponding heat sink segments 42 are now not "T"-shaped but tab-shaped, and bent inwards and downwards. As a result, the heat sink segments 42 can be inserted into a corresponding clearance on the lower driver housing 6*b*, or between the upper driver housing 6*a* and the lower driver housing 6*b*, for example on a circular groove. The two heat sink parts 44*a*, 44*b* in the area of the carrier substrate 2 can be laterally retained in the area of the carrier substrate 2 by the side edge of the bulb 3 or, if used, by the snap-fit hooks 9.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A lighting device comprising:

at least one light source;

an at least partly translucent bulb; at least one heat sink configured to cool the at least one light source, the at least one heat sink having a contact area with one or more bent sheet metal parts extending from an edge of the contact area, each of the one or more bent sheet metal parts forming a heat sink segment, and each heat sink segment having a free end; and a driver housing having an upper housing, proximal to the at least one light source, the upper housing being located at least partly within the at least one heat sink when the lighting device is assembled, and a lower housing, distal from the at least one light source when the lighting device is assembled, wherein the upper housing has a surrounding ring having notches arranged in a peripheral direction, the free ends of the heat sink segments being configured so as to be lockingly insertable into the peripherally extending notches, wherein the at least one heat sink has a tube-like shape and comprises plural bent sheet metal parts forming the heat sink segments and clearances alternating in a peripheral direction, and wherein the at least partly translucent bulb has at least one catching portion formed, on a portion of the bulb, that engages with at least one of the clearances and locks onto the at least one heat sink.

2. The lighting device as claimed in claim 1, wherein each of at least some of the heat sink segments comprise at least one bent cooling fin.

3. The lighting device as claimed in claim 1, wherein the driver housing comprises at least one cooling rib of which at least a part protrudes into a corresponding clearance.

4. The lighting device as claimed in claim 1, wherein the contact area is configured to support a carrier substrate for the at least one light source.

5. The lighting device as claimed in claim 1, wherein at least some areas of one surface of the at least one heat sink are surface-treated in order to increase heat emission.

6. The lighting device as claimed in claim 1, wherein the bulb presses the carrier substrate onto the edge of the contact area of the at least one heat sink.

7. The lighting device as claimed in claim 1, wherein the at least one heat sink is constructed in two parts from two bent punched sheet metal parts, the two bent sheet metal parts being held together when the lighting device is assembled at least by the driver housing and the bulb.

8. A method for producing a heat sink of the lighting device as claimed in claim 1, wherein the method comprises steps of:

blanking radially extending clearances at an edge of a metal sheet so as to form the contact area with the one or more bent sheet metal parts extending from the edge of the contact area to form the one or more heat sink segments, such that each heat sink segment has the free end; and bending up the one or more heat sink segments that remain between the clearances at the contact area.

9. The method as claimed in claim 8, further comprising bending of cooling fins on the remaining one or more heat sink segments.

10. The method for producing a lighting device as claimed in claim 8, further comprising:

inserting the driver housing into the at least one heat sink;

inserting the free ends of the heat sink segments into the peripherally extending notches of the upper housing; and fixing a carrier substrate to the contact area.

11. The lighting device as claimed in claim 1, wherein the bent sheet metal parts are punched metal parts.

* * * * *